United States Patent [19]

Lin

[11] Patent Number: 5,520,279

[45] Date of Patent: May 28, 1996

[54] COMPACT DISK CARRYING CONTAINER

[76] Inventor: Shih-Hsien Lin, P.O. Box 82-144, Taipei, Taiwan

[21] Appl. No.: 367,974

[22] Filed: Dec. 30, 1994

[51] Int. Cl.⁶ ................................................ B65D 85/57
[52] U.S. Cl. ...................... 206/308.1; 206/310; 220/23.4
[58] Field of Search .................................. 206/307–313, 206/308.1, 387.12; 220/23.4

[56] References Cited

U.S. PATENT DOCUMENTS

| | | | |
|---|---|---|---|
| 4,046,255 | 9/1977 | Ackeret | 206/387.1 |
| 4,702,533 | 10/1987 | Seifert | 206/308.1 |
| 5,249,677 | 10/1993 | Lim | 206/308.1 |
| 5,360,107 | 11/1994 | Chasin et al. | 206/308.1 |
| 5,425,450 | 6/1995 | Lin | 206/308.1 |

Primary Examiner—Jimmy G. Foster
Attorney, Agent, or Firm—Alfred Lei

[57] ABSTRACT

A compact disk carrying container comprising: an upper cover having left and right side walls each formed with a plurality of inwardly extending flanges at a lower edge and a projection close to a rear end; and a lower cover having a left side and a right side walls each formed with an upper groove and a lower groove, said upper groove being provided with a protuberance adapted to engage the projection of said upper cover while said lower groove being adapted to receive the flanges of said upper cover thereby enabling said upper cover to slide with respect to said lower cover, said lower cover being formed at a center with a retainer for keeping a compact disk in place.

4 Claims, 13 Drawing Sheets

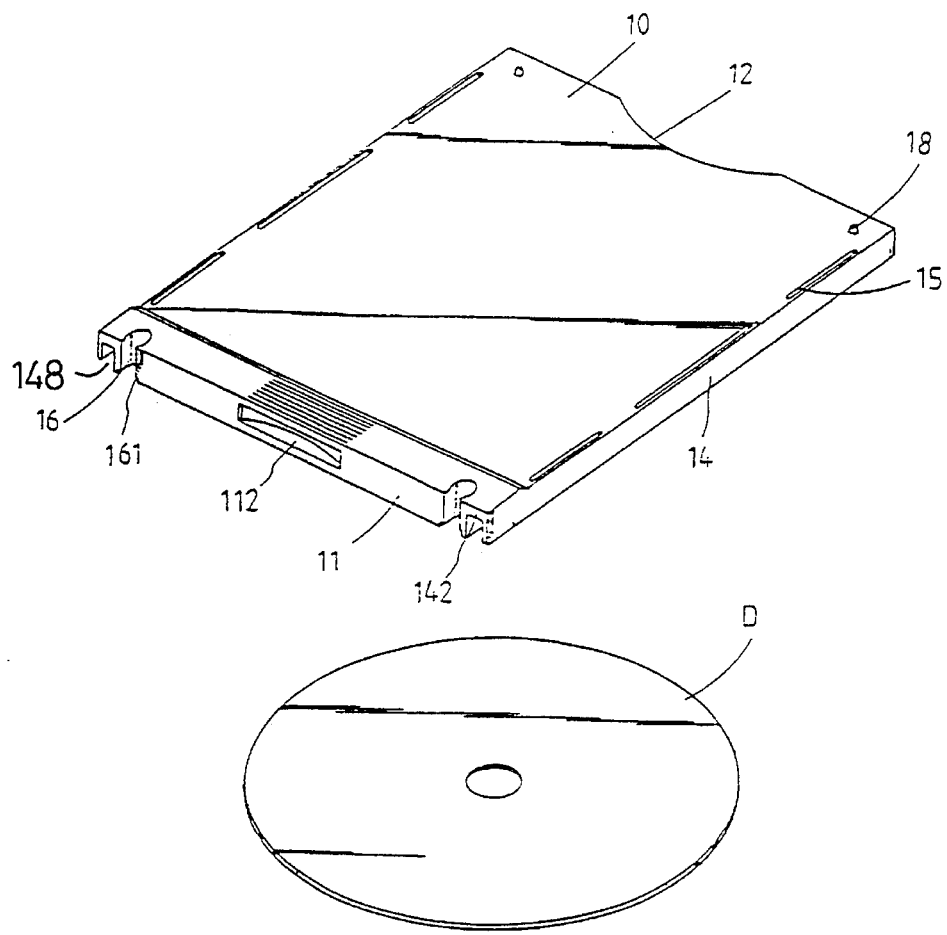
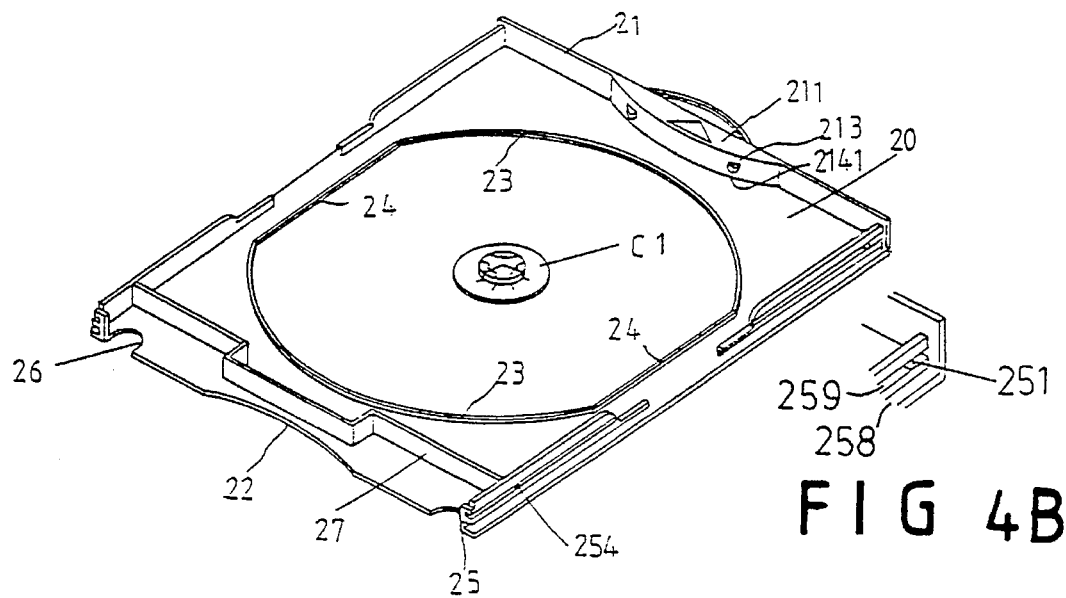
FIG. 4B
FIG. 4A

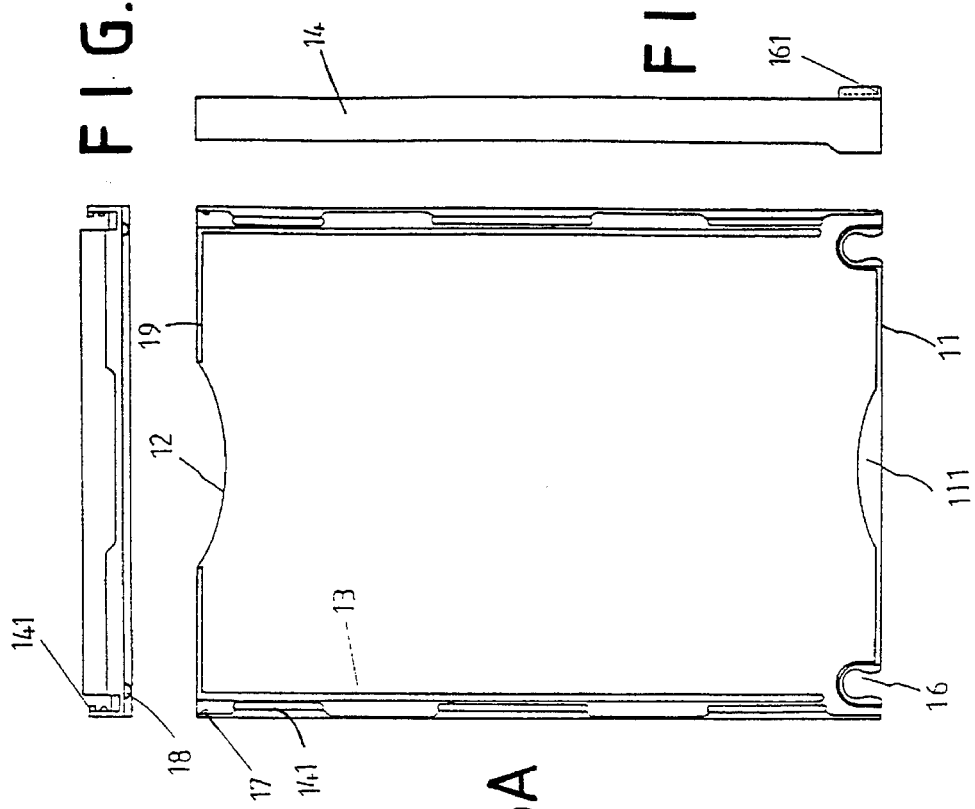
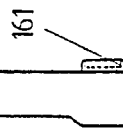
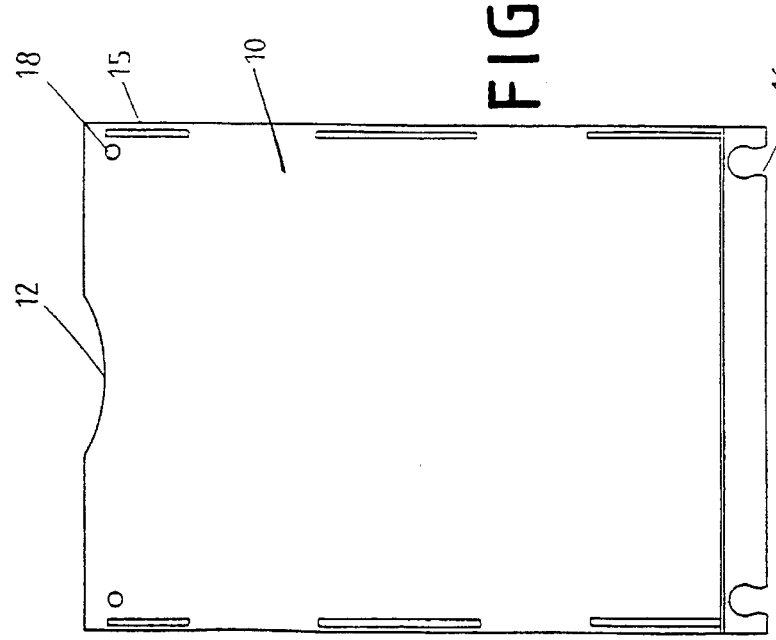
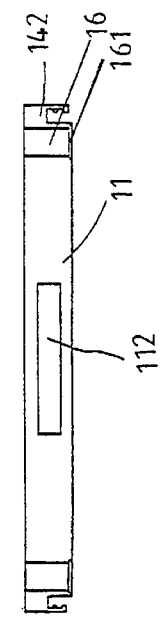
FIG. 5A  FIG. 5B  FIG. 5C  FIG. 5D  FIG. 5E

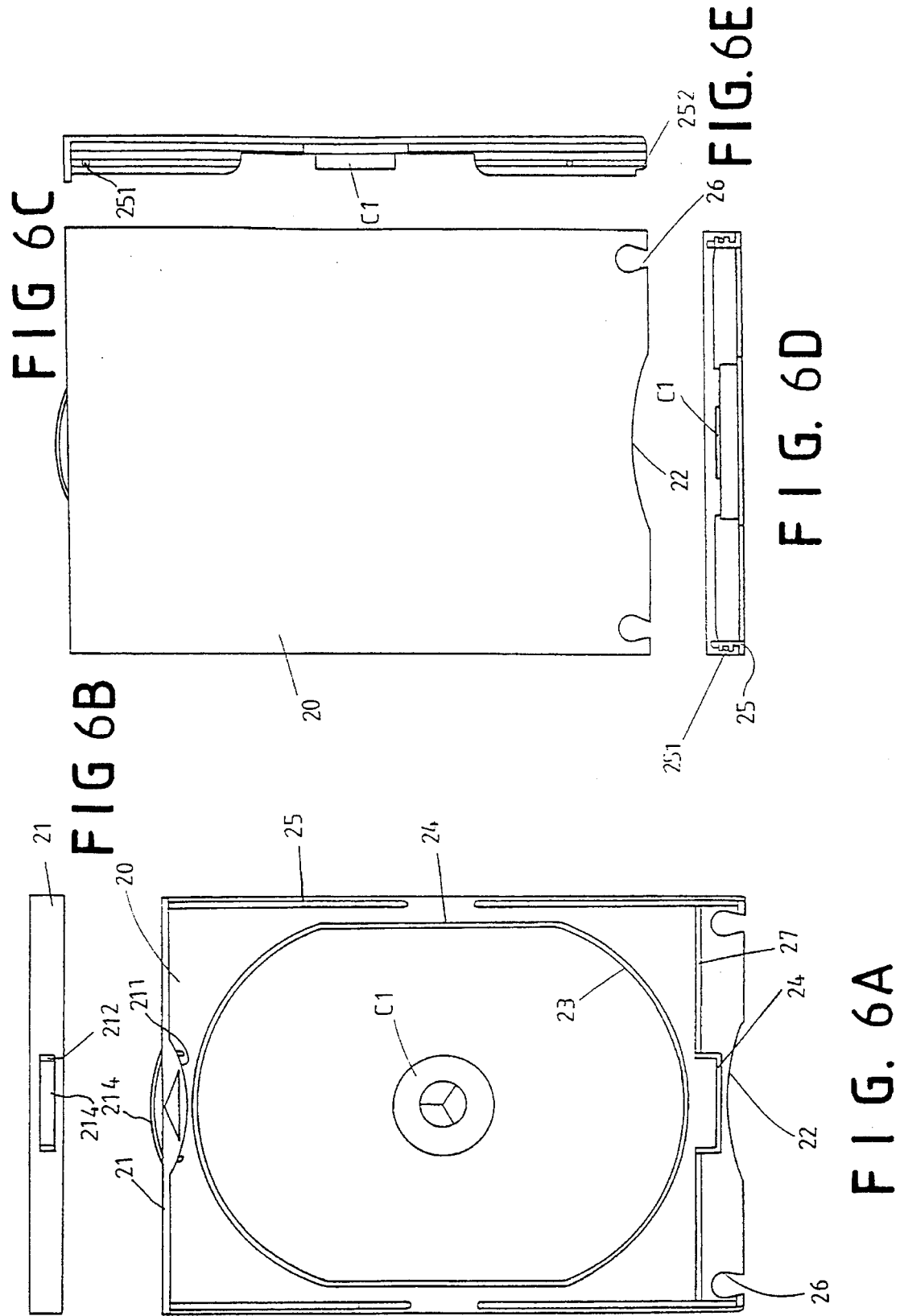

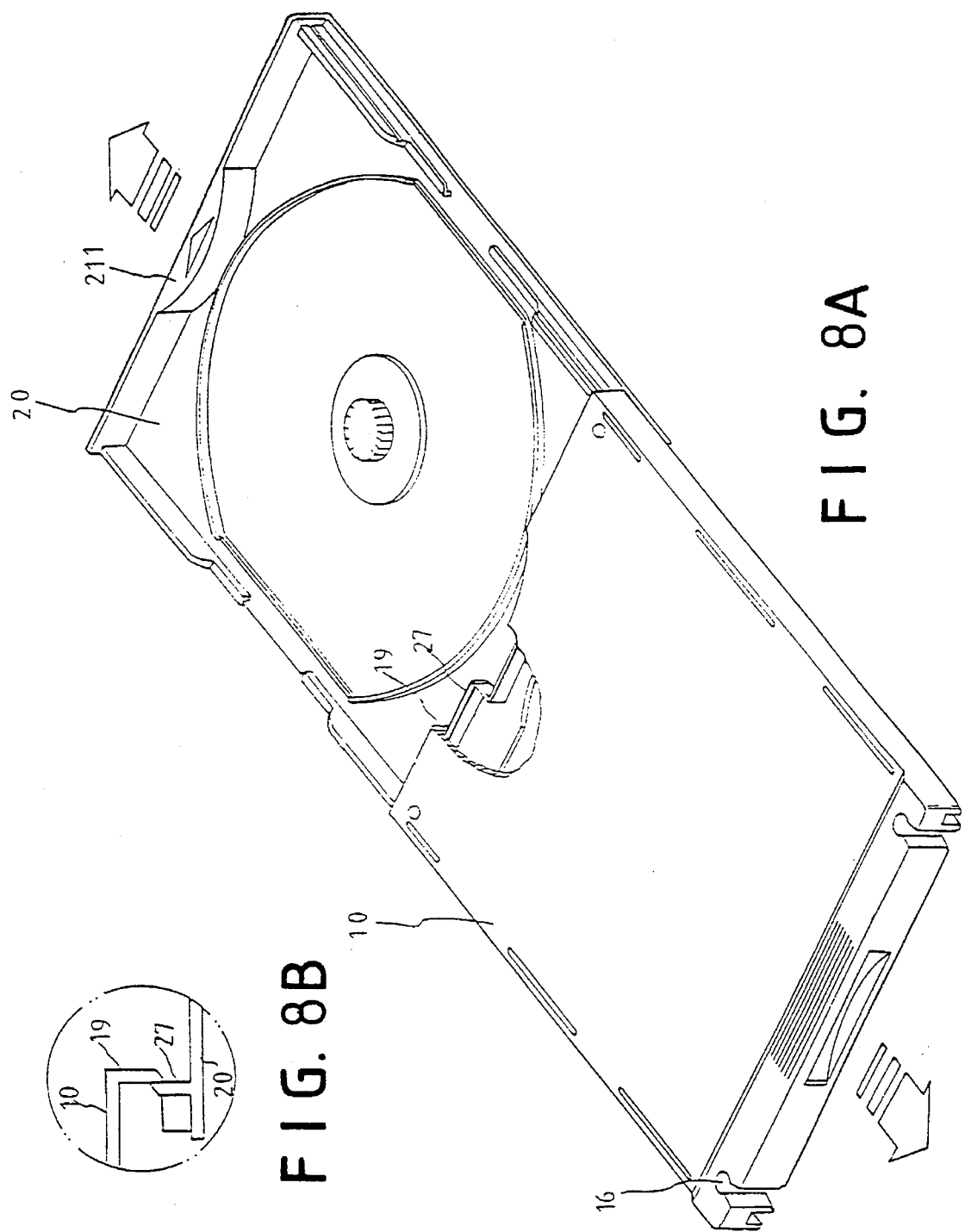

COMPACT DISK CARRYING CONTAINER

BACKGROUND OF THE INVENTION

It has been found that the conventional compact disk carrying container consists of an upper cover A, a lower cover B hingedly connected with the upper cover at one side, and a disk holder C fitted in the lower cover B. The upper cover is formed at both sides with a vertical side wall having a cavity A1. The lower cover B is formed at both sides with a protuberance A1 adapted to engage the cavity A1 of the upper cover A. The disk holder is formed with a retainer C1 at the center for keeping a compact disk in place. However, such a compact disk carrying container has the following drawbacks:

1. Three molds are required for manufacture thereby increasing the manufacturing cost.
2. It is not easy to open.
3. It is often confusing as to finding out the correct direction to open the compact disk carrying container.
4. The hinge connection between the upper cover A and the lower cover B is so weak that it will be easily broken when dropping down on the ground.
5. It is necessary to prepare a cabinet for storing the compact disk carrying containers hence increasing the burden to the user.

It is, therefore, an object of the present invention to provide an improved compact disk carrying container which can obviate and mitigate the above-mentioned drawbacks.

SUMMARY OF THE INVENTION

This invention relates to an improved compact disk carrying container.

It is the primary object of the present invention to provide a compact disk carrying container which is simple in container.

It is another object of the present invention to provide a compact disk carrying container which requires only two molds for manufacture.

It is still another object of the present invention to provide a compact disk carrying container which is low in cost.

It is still another object of the present invention to provide a compact disk carrying container which is smooth in operation.

It is still another object of the present invention to provide a compact disk carrying container which is easy to open.

It is still another object of the present invention to provide a compact disk carrying container which can be firmly kept at a closed condition thereby preventing the compact disk from dropping out inadvertently.

It is a further object of the present invention to provide a compact disk carrying container which can be conveniently connected with a plurality compact disk carrying container as desired.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 4A is an exploded view of the present invention;

FIG. 4B is an enlarged fragmentary view of the present invention;

FIG. 5A is a top view of the upper cover;

FIG. 5B is a front view of the upper cover;

FIG. 5C is a bottom view of the upper cover;

FIG. 5D is a rear view of the upper cover;

FIG. 5E is a side view of the upper cover;

FIG. 6A is a top view of the lower cover;

FIG. 6B is a rear view of the lower cover;

FIG. 6C is a bottom view of the lower cover;

FIG. 6D is a front view of the lower cover;

FIG. 6E is a side view of the lower cover;

FIG. 8A shows the open condition of the present invention;

FIG. 8B is an enlarged fragmentary view of FIG. 8A;

DETAILED DESCRIPTION OF THE PREFERRED EMBODIMENT

Figure 1:
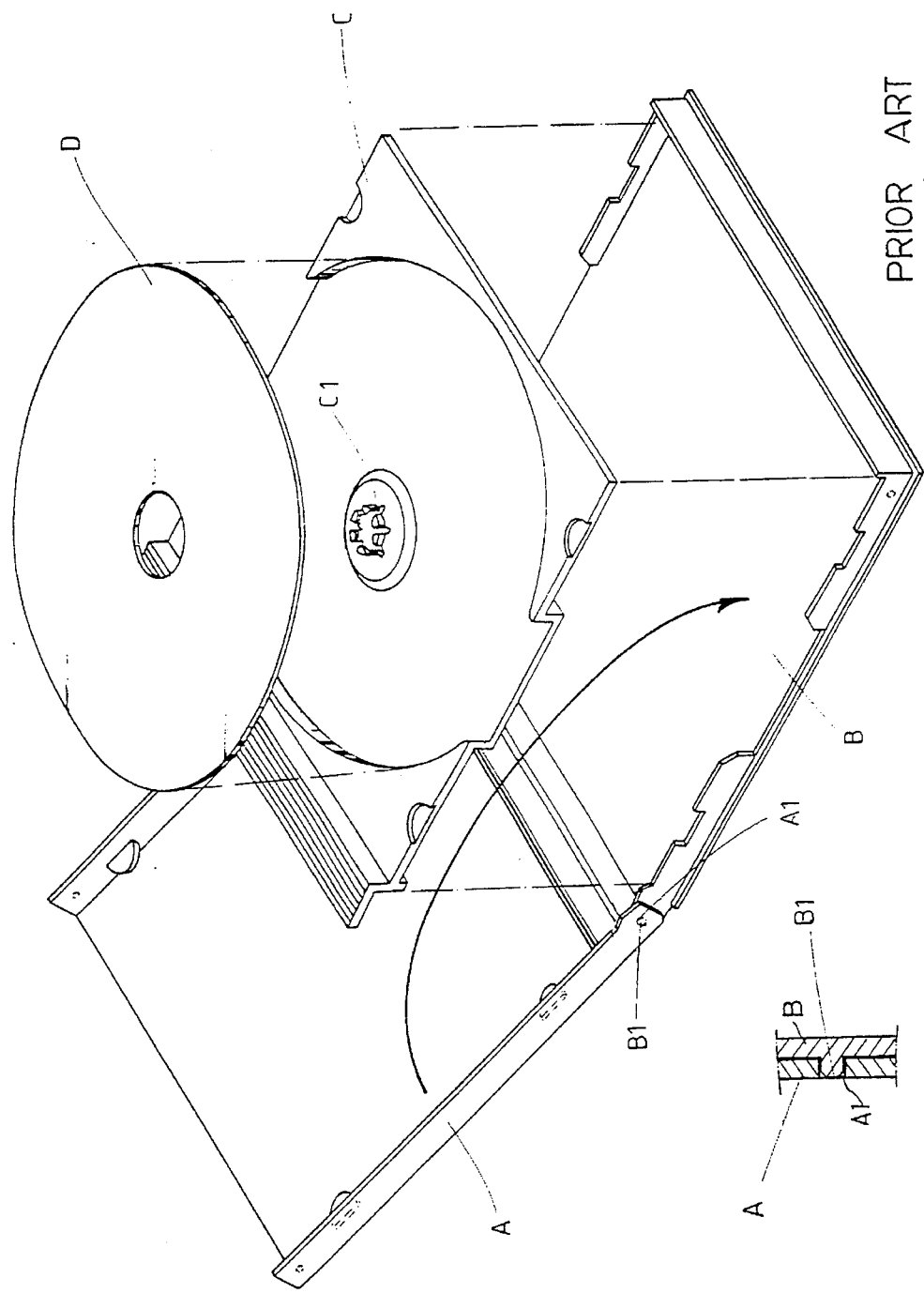
FIG. 1A is an exploded view of a first prior art compact disk container.
FIG. 1B is an enlarged fragmentary view of FIG. 1A.
Figure 2:
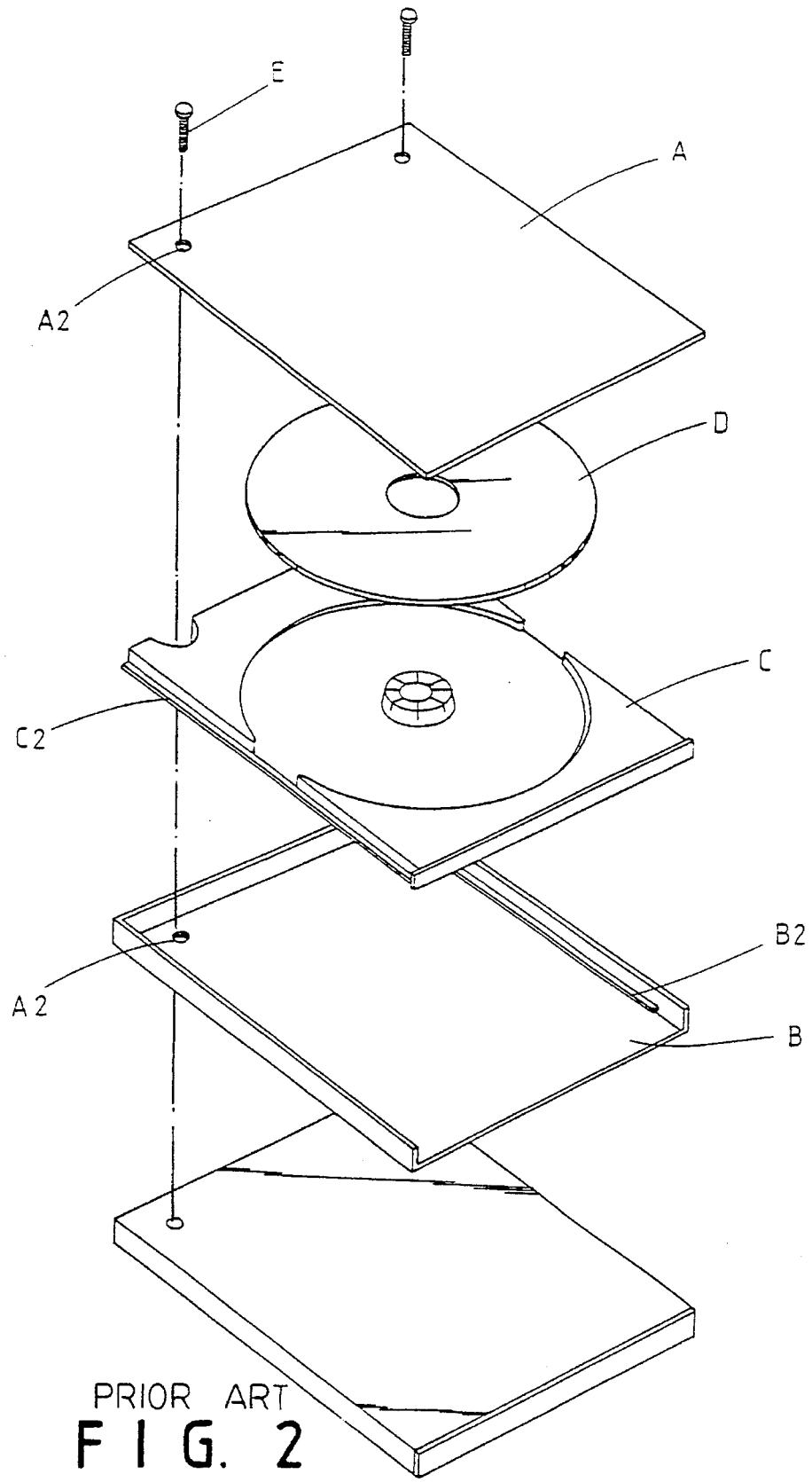
FIG. 2 is an exploded view of a second prior art compact disk container.
Figure 3A:
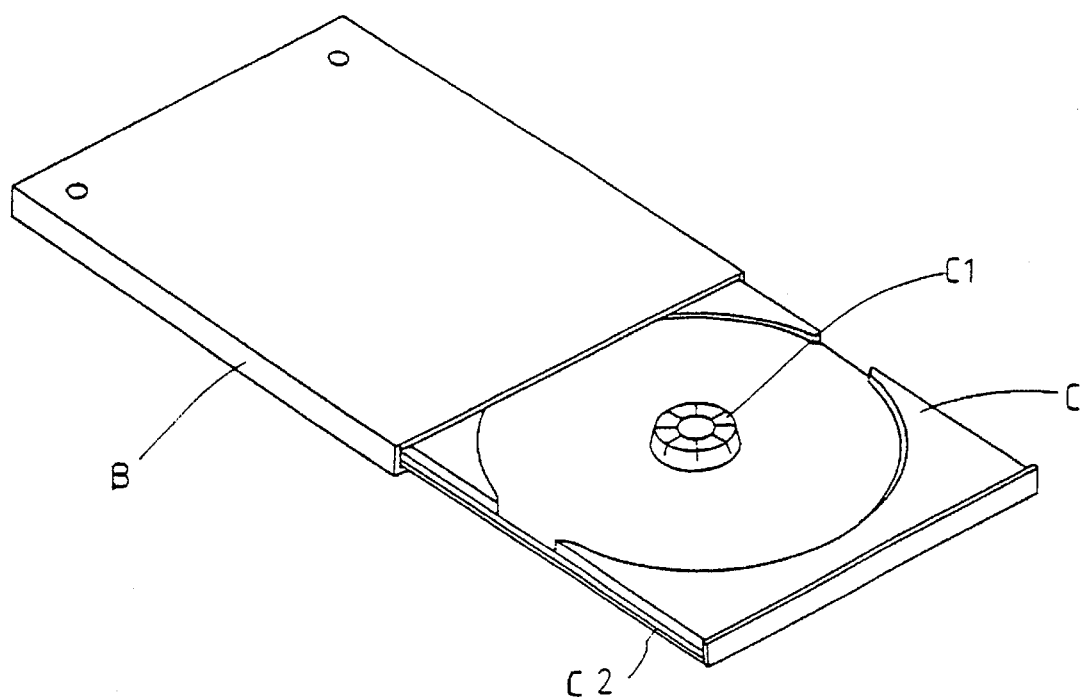
FIG. 3A is a perspective view of the second prior art compact disk container.
Figure 3B:
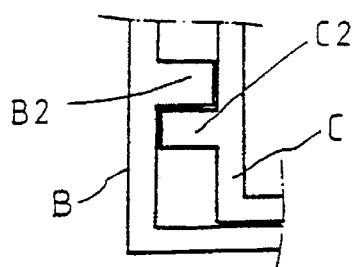
FIG. 3B shows a sliding structure of the second prior art compact disk container.
Figure 3C:
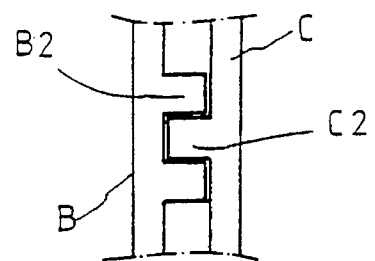
FIG. 3C shows another sliding structure of the second prior art compact disk container.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 4 thereof, the compact disc carrying container according to the present invention mainly comprises an upper cover 10 and a lower cover 20.

As shown in FIGS. 4A, 4B, 5A, 5B, 5C, 5D and 5E, the upper cover 10 is formed with left and right side walls 14 each formed with a plurality of inwardly extending flanges 141 at the lower edge. Each of the side wall 14 has a projection 17 close to the rear end. An elongated member 13 which is parallel to the side wall 14 depends downwardly from the bottom surface of the upper cover 10. Between the elongated member 13 and the side wall 14 there are a plurality of slots 15. The rear side of the upper cover 10 is formed with two elongated portions 19 and curved recess 12 between the two elongated portions 19. Each of the elongated portions 19 extends to connect with the corresponding elongated member 13. The front side 11 of the lower cover 10 has two vertical key slots 16 at both ends and a curved portion 111 protruding inward at the intermediate portion. The curved portion 111 is formed with a curved groove 112. The vertical key slot 16 is formed an enlarged portion 161 at the lower end. Between the slot 16 and the side wall 14 there is a notch 148. The upper cover 10 is further provided with two projections 18 on the top thereof.

Figure 7A:
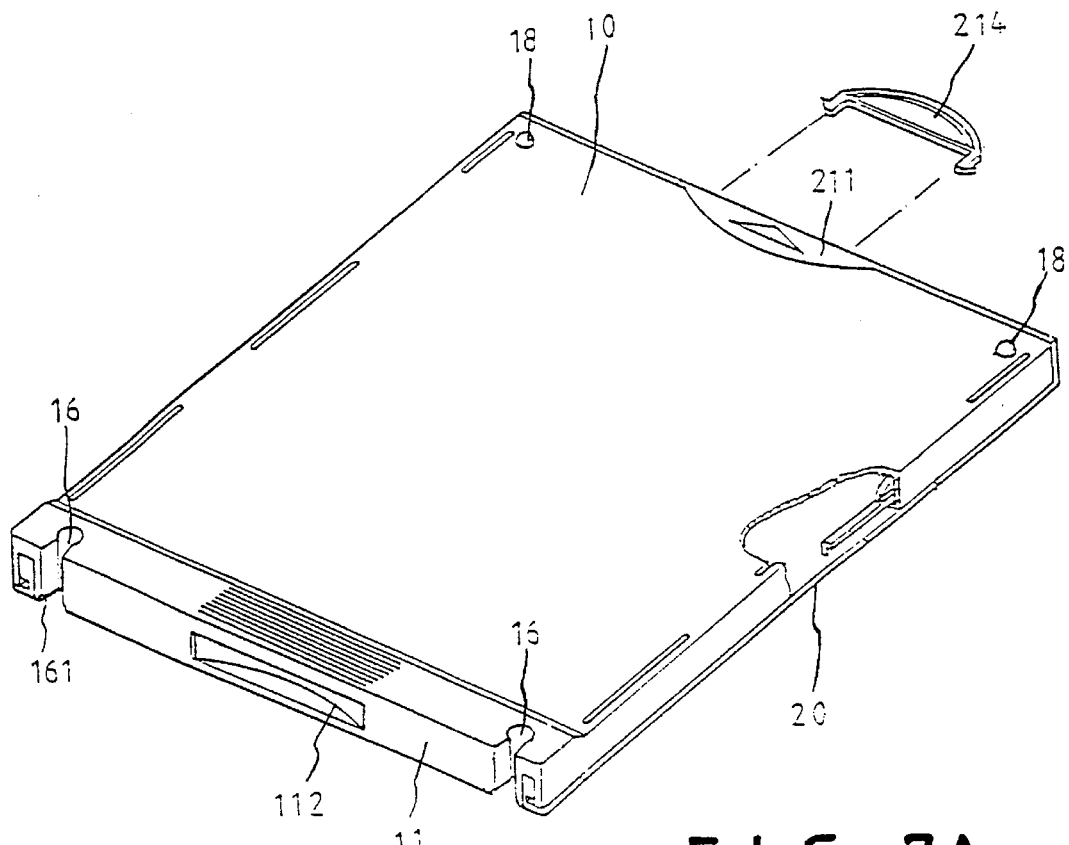
FIG. 7A is a partly broken perspective view of the present invention.
Figure 7B:
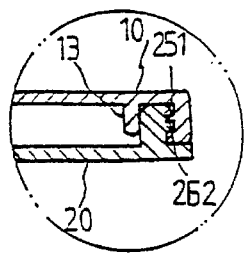
FIG. 7B is an enlarged fragmentary view of FIG. 7A.
Figure 7C:
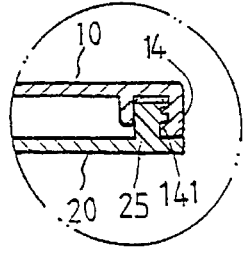
FIG. 7C is another enlarged fragmentary view of FIG. 7A.
Figure 7D:
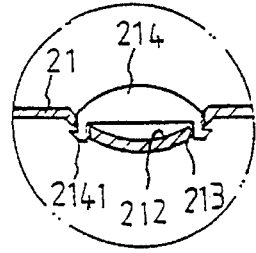
FIG. 7D is still another enlarged fragmentary view of FIG. 7A.

Referring to FIGS. 4, 6A, 6B, 6C, 6D and 6E, the lower cover 20 is provided at the center with a retainer C1 for keeping a compact disk in place. The lower cover 20 includes a left side, a right side, a rear side 21, and a front side 27. The left and right sides of the lower cover 20 are formed with two spaced racks 25 which are aligned with each other. Each of the racks 25 is formed with an upper groove 259 and a lower groove 258 which are parallel to each other. On the upper groove 259 there are two projections 251 at two ends. The front side of the lower cover 20 has two vertical key slots 26 which are in alignment with the vertical key slots 16 of the upper cover 10. At the intermediate portion of the front side of the lower cover 20 there is a curved recess 22 which is adapted to receive the curved portion 112 of the upper cover 10. A partition composed of ribs 24 and 27 is formed just behind the front side of the lower cover 20. The intermediate portion of the rear side 21 of the lower cover 20 has a curved portion 211 which protrudes inward and adapts to be received in the curved recess 12 of the upper cover 10. The curved portion 211 is formed with a curved cavity having two openings 213 adapted to engage two hooks 2141 of a handle 214 (see FIG. 7C).

When the upper cover 10 and the lower cover 20 are fitted together, the flange 141 of the upper cover 10 is adapted to the lower groove 258 of the lower cover 20 while the projections 17 are slidably engaged with the upper groove 259 of the lower cover 20 thereby enabling the upper cover 10 to slide with respect to the lower cover 20. As the upper cover 10 is pushed to close the lower cover 20, the projections 17 of the upper cover 10 will be engaged with the projections 251 of the lower cover 20 so that the upper cover 10 will be firmly engaged with the lower cover 20 hence preventing it from being inadvertently opened.

Figure 9A:
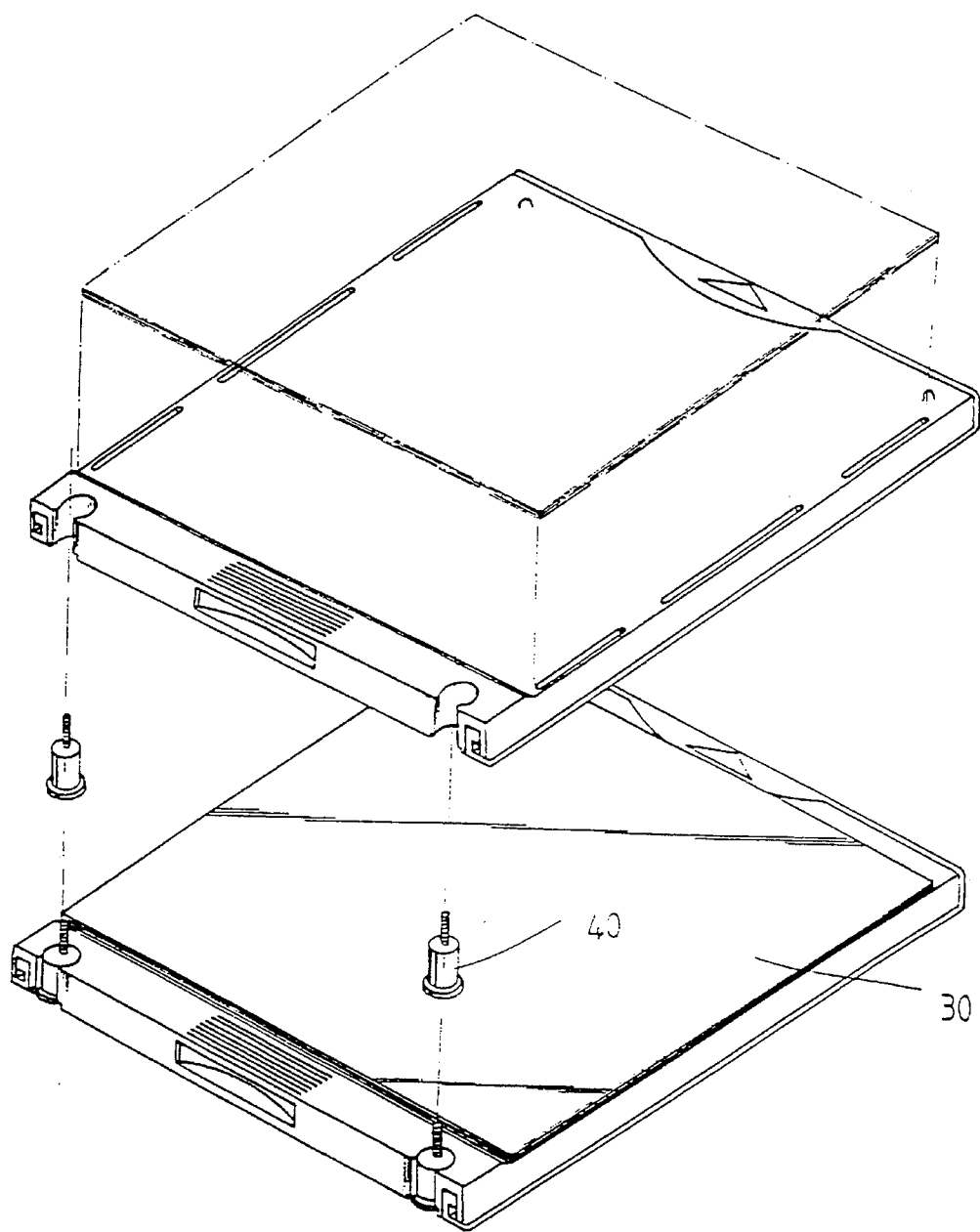
FIG. 9A shows the way to engage a plurality of compact disk carrying containers together.
Figure 9B:
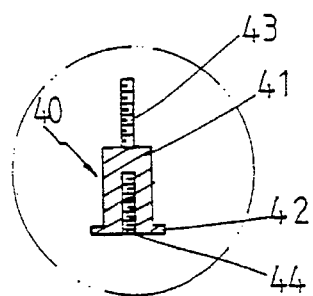
FIG. 9B is an enlarged sectional view of the securing bolt.
Figure 10:
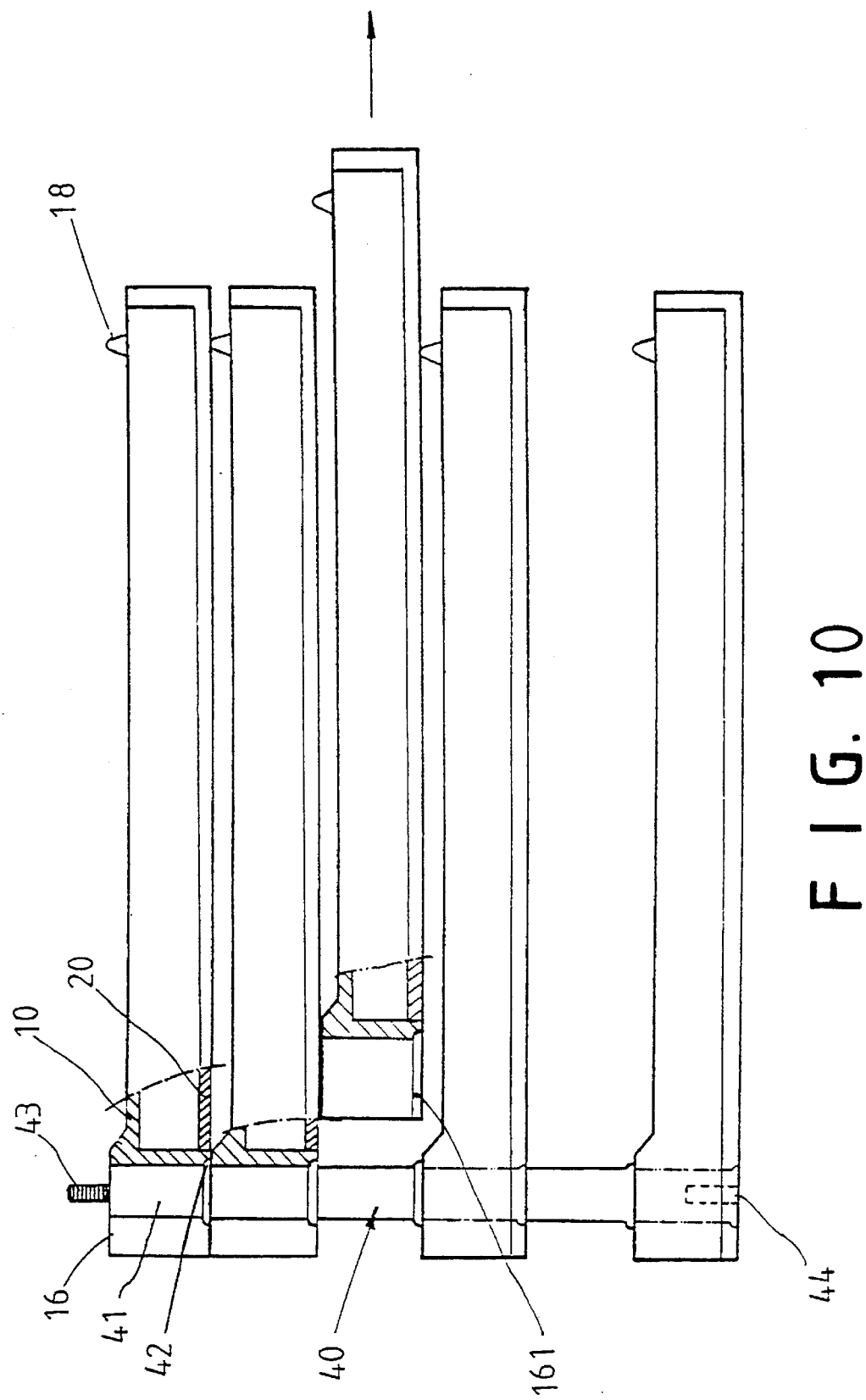
FIG. 10 shows the way to remove a desired compact disk carry container.

A securing bolt 40 with a flange 42 and a head portion 41 is snugly fitted into the vertical slot of the container (see FIGS. 9A and 9B). The flange 42 is adapted to the enlarged portion 161 of the vertical slot 16 of the upper cover 10 while the head portion 41 fitted into the vertical slot 26 of the lower cover 20. Further, the bottom of the securing bolt 40 is formed with a threaded hole 44 at the center so that the bottom of a securing bolt 40 can be engaged with the threaded rod portion 43 of another securing bolt 60 thus enabling a plurality of the containers to be connected together. When desired to remove a container, it is only necessary to pull the container out of the securing bolt 60 (see FIG. 10).

Figure 11:
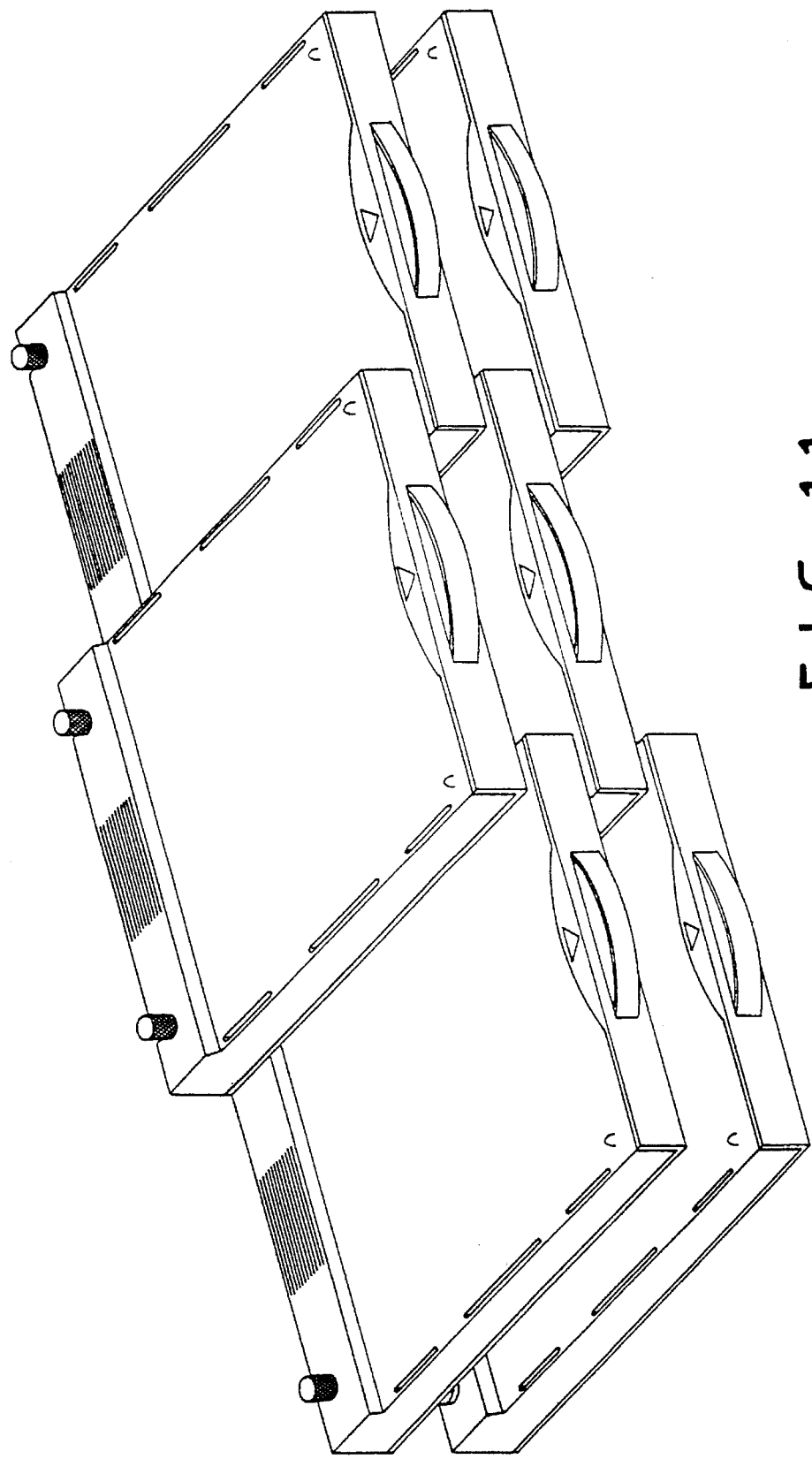
FIG. 11 shows another arrangement of the compact disk carrying container according to the present invention.
Figure 12:
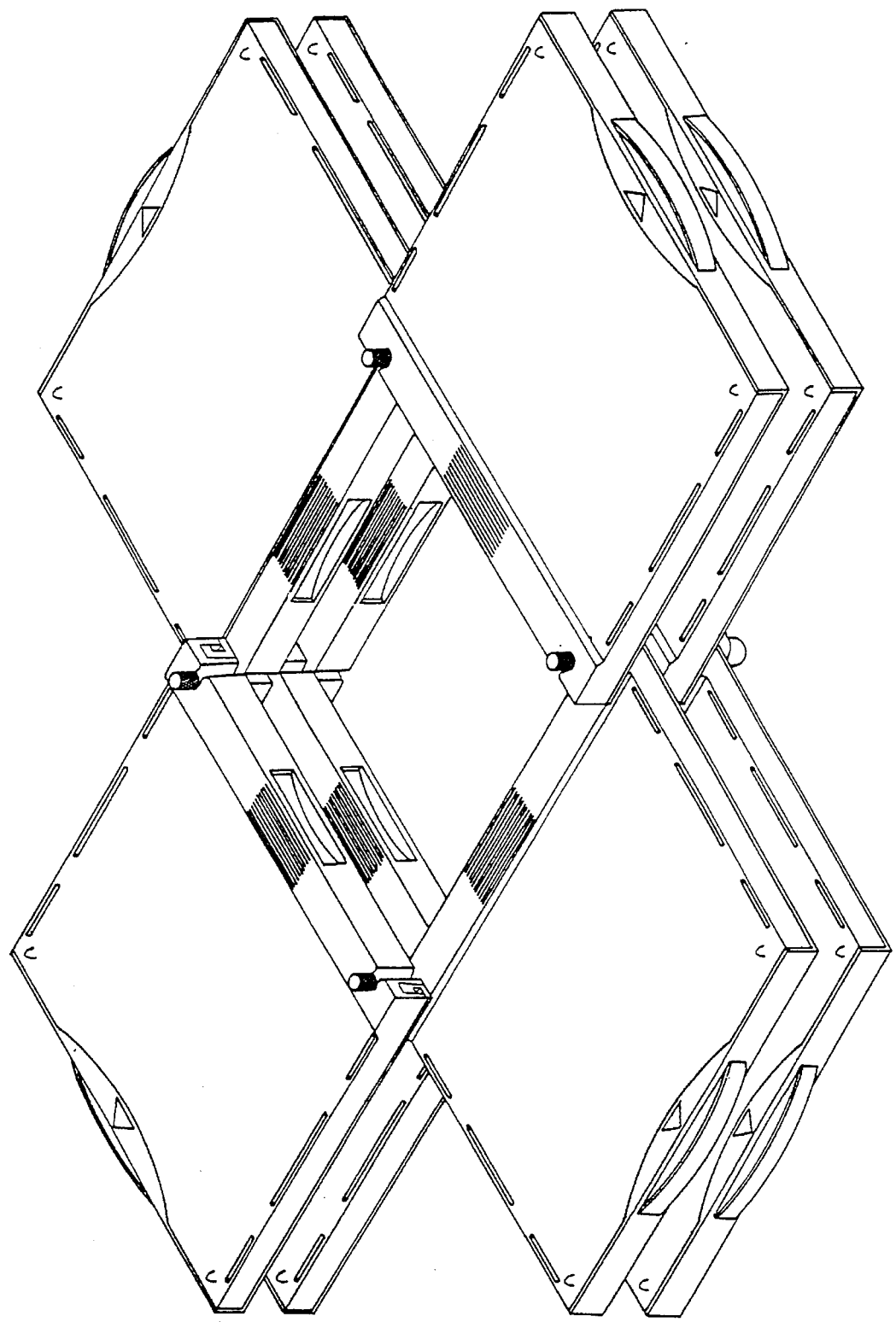
FIG. 12 shows a third arrangement of the compact disk carrying container according to the present invention.
Figure 13:
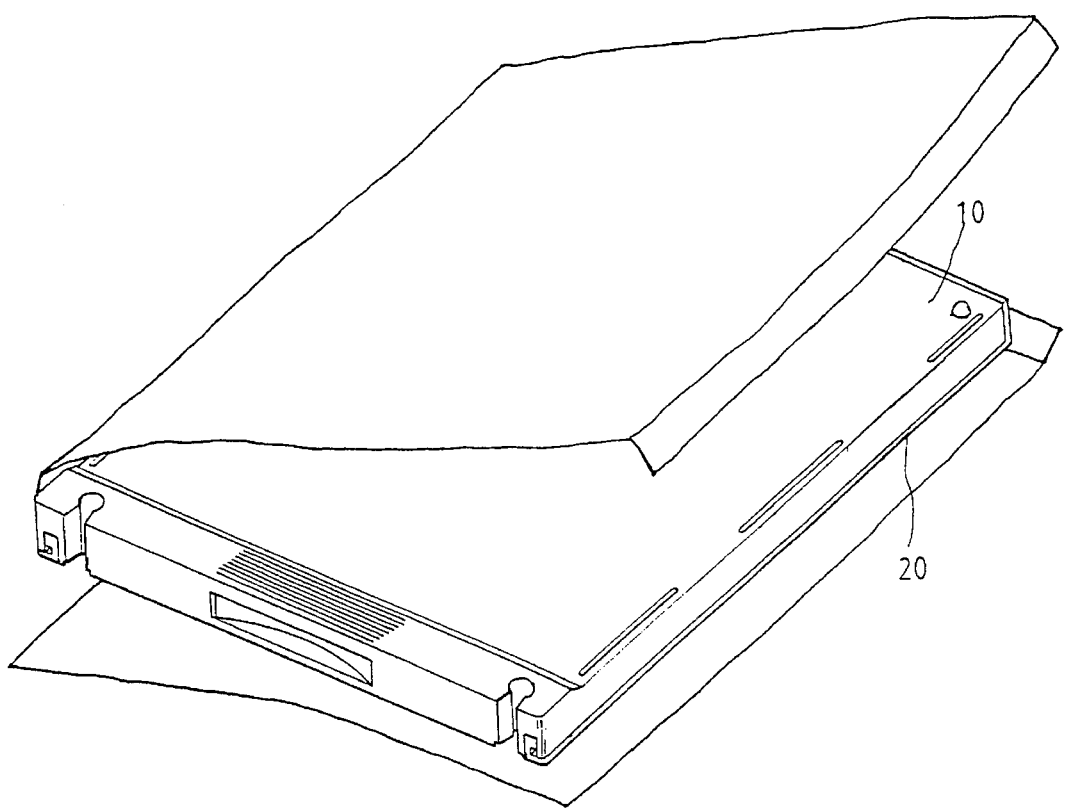
FIG. 13 illustrates the way to package the present invention.

Further, the containers can be conveniently connected in any desired arrangement such as those shown in FIGS. 11 and 12.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A compact disk carrying container comprising:
   an upper cover having left and right side walls each formed with a plurality of inwardly extending flanges at a lower edge and a projection close to a rear end of the upper cover; and
   a lower cover having left and right side walls each formed with an upper groove and a lower groove, said upper groove being provided with a protuberance adapted to engage the projection of said upper cover while said lower cover being adapted to received the flanges of said upper cover thereby enabling said upper cover to slide with respect to said lower cover, said lower cover being formed at a center with a retainer for keeping a compact disk in place.

2. The compact disk carrying container as claimed in claim 1, wherein said upper cover is formed at a rear side with two vertical key slots with an enlarged portion at a lower end.

3. The compact disk carrying container as claimed in claim 1, wherein said upper cover has a front side provided with a curved portion protruding inward, said curved portion being formed with a curved groove.

4. The compact disk carrying container as claimed in claim 1, further comprising two securing bolts adapted to fit into said vertical key slot.

* * * * *